United States Patent [19]

Glenning

[11] Patent Number: 5,655,126
[45] Date of Patent: Aug. 5, 1997

[54] METHOD & APPARATUS FOR A POWER MANAGEMENT PSEUDO-DEVICE DRIVER

[75] Inventor: Anthony Glenning, Palo Alto, Calif.

[73] Assignee: Sun Microsystems, Inc., Mountain View, Calif.

[21] Appl. No.: 594,416

[22] Filed: Jan. 31, 1996

Related U.S. Application Data

[63] Continuation of Ser. No. 200,676, Feb. 23, 1994, abandoned.
[51] Int. Cl.$^6$ ........................................ G06F 1/32
[52] U.S. Cl. ............................... 395/750.06; 395/750.01
[58] Field of Search ................................ 395/750, 725; 371/67.1

[56] References Cited

U.S. PATENT DOCUMENTS

| | | | |
|---|---|---|---|
| 4,593,349 | 6/1986 | Chase et al. | 395/750 |
| 4,663,539 | 5/1987 | Sharp et al. | 395/750 |
| 4,794,525 | 12/1988 | Pickert et al. | 395/750 |
| 5,237,692 | 8/1993 | Raasch et al. | 395/750 |
| 5,276,888 | 1/1994 | Kardach et al. | 395/725 |
| 5,355,501 | 10/1994 | Gross et al. | 395/750 |
| 5,390,334 | 2/1995 | Harrison | 395/750 |
| 5,396,635 | 3/1995 | Fung | 395/750 |
| 5,402,431 | 3/1995 | Saadeh et al. | 371/67.1 |
| 5,404,546 | 4/1995 | Stewart | 395/750 |

FOREIGN PATENT DOCUMENTS

| | | | |
|---|---|---|---|
| WO93/06545 | 4/1993 | Germany | G06F 1/32 |

*Primary Examiner*—Jack B. Harvey
*Assistant Examiner*—David A. Wiley
*Attorney, Agent, or Firm*—Blakely, Sokoloff, Taylor & Zafman

[57] ABSTRACT

A power management system for conserving power in a computer system that runs the UNIX® operating system. The power management system comprises a power management pseudo-device driver, power management compatible device drivers for power manageable hardware devices, and additions to the Device Driver Interface and Driver Kernel Interface (DDI/DKI) layer. Each power management compatible device driver maintains last access times for its associated hardware device components. The power management pseudo-device driver periodically checks the last access time for all the power manageable hardware device components in the computer system. If the power management pseudo-device driver determines that a hardware device component is idle, the power management pseudo-device driver instructs the idle hardware device's associated device driver to reduce power to the idle hardware device component. If an access request is later received by a powered down device component, the power management pseudo-device driver is informed about the access request. The power management pseudo-device driver then powers the hardware device component back up such that the hardware device component can process the access request.

18 Claims, 5 Drawing Sheets

METHOD & APPARATUS FOR A POWER MANAGEMENT PSEUDO-DEVICE DRIVER

This is a continuation of application Ser. No. 08/200,676, filed Feb. 23, 1994, now abandoned.

FIELD OF THE INVENTION

The present invention relates to the field of power management systems for computer systems. Specifically, the invention relates to a UNIX® pseudo-device driver that manages the power consumption of hardware components.

BACKGROUND OF THE INVENTION

Portable personal computers have become increasingly common and portable workstations are starting to appear on the market. Currently, most workstations operate using some variant of the UNIX® operating system.

To enable a portable computer to operate on battery power for a significant period of time, some type of power management scheme is required. Some portable personal computers based upon Intel® microprocessors implement a hardware based power management system called Advanced Power Management. However, there is currently no power management scheme that is compatible with the UNIX® operating system. Thus, it would be desirable to implement a power management system that is compatible with the UNIX® operating system such that a power conserving portable workstation can be built.

SUMMARY OF THE INVENTION

The present invention discloses a method and apparatus for conserving power in a computer system that runs the UNIX® operating system. The power management system can be implemented with a power management pseudo-device driver, power management compatible device drivers for power manageable hardware components, and additions to the DDI/DKI layer. Each power management compatible device driver maintains the last access times for its associated hardware components. The power management pseudo-device driver periodically checks the last access time for each of the power manageable hardware component in the computer system. If the power management pseudo-device driver determines that a hardware component is idle, the power management pseudo-device driver instructs the idle hardware components associated device driver to reduce power to the idle hardware component. If an access request is later received by a powered down device, the power management pseudo-device driver is informed about the access request. The power management pseudo-device driver then powers the hardware component back up such that the hardware component can process the access request.

BRIEF DESCRIPTION OF THE DRAWINGS

The objects, features, and advantages of the present invention will be apparent from the following detailed description of the preferred embodiment of the invention with references to the following drawings.

FIG. 2b illustrates the device driver responding to the ioctl() call made by the user application process in FIG. 2a.

DETAILED DESCRIPTION

Methods and apparatus for a power management pseudo-device driver are disclosed. In the following description, for purposes of explanation, specific nomenclature is set forth to provide a thorough understanding of the present invention. However, it will be apparent to one skilled in the art that these specific details are not required to practice the present invention. For example, the present invention is explained with reference to device drivers in the UNIX® operating system. However, the teachings of the present invention can be used in other operating systems with dedicated hardware component driver routines that hide the control of individual hardware components from the operating system.

The UNIX® Operating System

Figure 1:
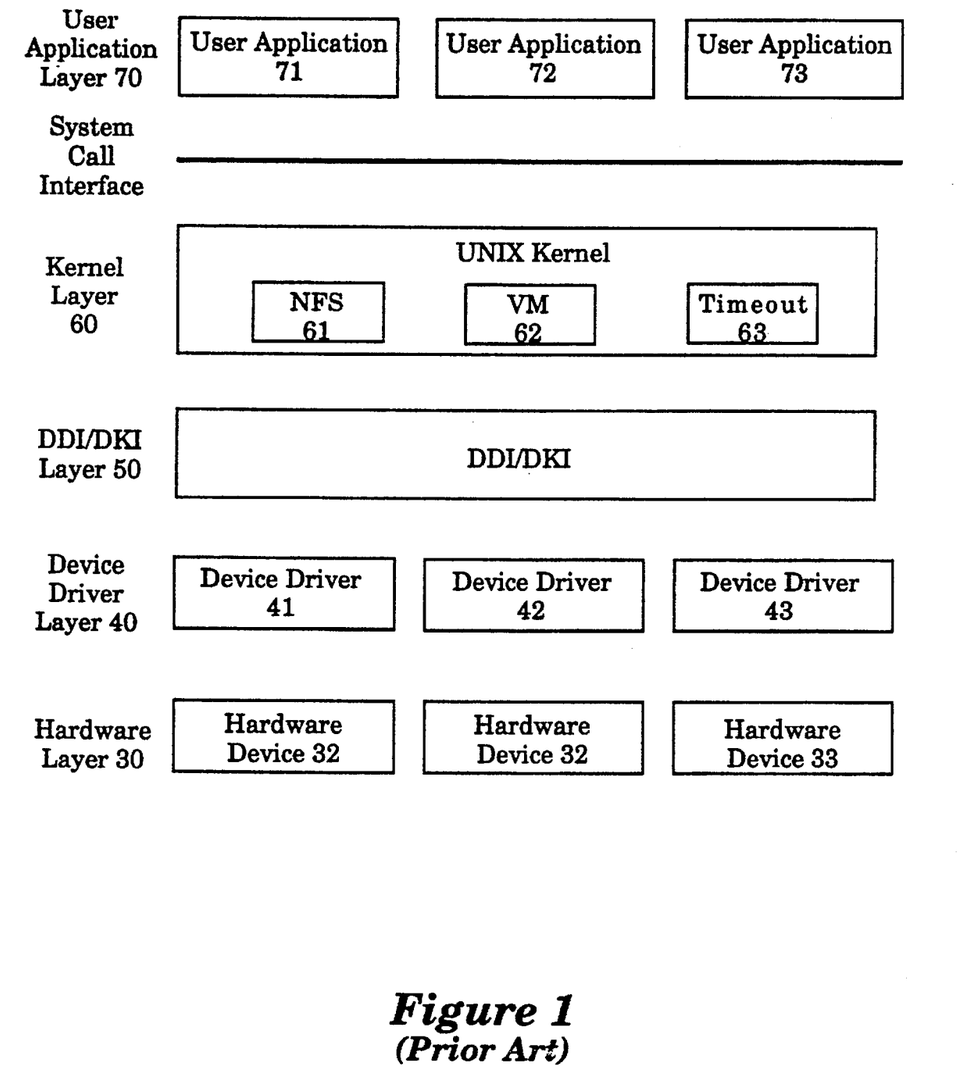
FIG. 1 illustrates a conceptual diagram of the UNIX® operating system.

FIG. 1 illustrates the hierarchical structure of the UNIX® operating system on a computer system. Beneath the UNIX® operating system is a hardware layer 30. The hardware layer 30 consists of the actual computer hardware that is being used to run the UNIX® operating system.

Immediately above the computer system hardware layer 30 are a set of device drivers (41, 42, and 43) in a device driver layer 40. The device drivers are responsible for interacting directly with the hardware layer. Different device drivers control different hardware devices. Each hardware device may have one or more power manageable hardware components.

Above the device driver layer 40 is a Device Driver Interface and Driver Kernel Interface (DDI/DKI) layer 50. The DDI/DKI layer 50 provides an interface between a kernel layer 60 and the individual device drivers. The DDI/DKI layer 50 also maintains a set of properties for each device driver in the system. The DDI/DKI layer 50 hides details about device drivers from the UNIX® kernel.

Above the DDI/DKI layer 50 is the kernel layer 60 that contains the UNIX® kernel. The UNIX®kernel implements most of the functionality of the UNIX® operating system. Within the kernel layer 60 are several operating system subsystems. In current implementations of UNIX, a network file system (NFS), a virtual memory manager (VM), and a timeout mechanism are implemented as operating system subsystems. The kernel layer 60 interacts with the computer hardware by making calls to the device drivers (41, 42, and 43) through the DDI/DKI layer 50.

Finally, above the kernel layer 60 are the user application programs (71, 72, and 73). The user application programs interact with the UNIX® operating system by making system calls to the UNIX® kernel. The UNIX® kernel processes the system call and returns a result to the user application program that made the system call.

A UNIX® Power Management System

The present invention comprises a power management system that is designed to operate efficiently under the UNIX® operating system. The power management system of the present invention may be implemented by making changes to three areas in the UNIX® operating system.

A first addition to a UNIX® operating system consists of a new Pseudo-Device Driver called the Power Management Pseudo-Device Driver (PM-Driver). The Power Management Pseudo-Device Driver is a special device driver that is not associated with any specific hardware device. Instead, the Power Management Pseudo-Device Driver interacts with other device drivers in the system to accomplish its goals. The Power Management Pseudo-Device Driver implements the majority of the functionality of the power management system of the present invention.

To directly control the power consumption of various hardware components, the power management system of the present invention can use special device drivers. Specifically, the power management system is preferably implemented with power management compatible device drivers that implement specific power management functions for their associated hardware components. Some hardware components, and thus their device drivers, are dependent upon parent hardware components and device drivers. For example, a disk drive with a disk drive device driver that is located on a SCSI bus cannot operate without the cooperation of a SCSI bus controller and SCSI bus controller device driver. Such dependencies are carefully observed by the present invention.

Finally, the power management system of the present invention preferably includes a few additions to the Device Driver Interface and Driver Kernel Interface (DDI/DKI) layer of the UNIX® operating system. The power management system adds a few new functions to the DDI/DKI layer such that the Power Management Pseudo-Device Driver can communicate with the power management compatible device drivers.

To effectively disclose the present invention, each of the three areas of change to the UNIX® operating system will be explained in detail. Following the explanations of the three sections, examples of the power management system in operation will be provided.

Power Management Compatible Device Drivers

To be efficiently expandable, the power management system of the present invention gives direct control of individual hardware component power management to each associated device driver. Thus, to operate most effectively with a power management system of the present invention, device drivers, such as 41, 42, and 43 illustrated in FIG. 1, should be written according to a set of power management specifications. The power management specifications set forth certain functions to be implemented and certain data to be exported. If a device driver does not export the proper information, the Power Management Pseudo-Device Driver will not power manage the device.

A first feature that should be added to each power management compatible device driver is a set of extensions to the detach() and attach() routines. Specifically, new commands should be added to the detach() and attach() routines that will save and restore a hardware component's state, respectively.

The detach() routine in each power management compatible device driver should have a new command (DDI_PM_SUSPEND) added. The DDI_PM_SUSPEND command halts the issuance of new requests to the hardware component. The state of the hardware component is then stored in memory. Finally, the device driver places itself into a suspended state. If the device driver is busy, or cannot be suspended for any other reason, the device driver returns a failure code indicating that it has not entered a suspended state. Thus, the detach() command halts all operations of the device driver.

Each device driver for the power management system should also implement a corresponding DDI_RESUME command for the attach() routine. The DDI_RESUME command for the attach() routine restores the state of the associated hardware component from the state information stored in memory. The device driver then takes itself out of the suspended state. The device driver resumes the issuance of requests. Thus, the DDI_RESUME command for the attach() routine restores the device driver to the state it was at before being shut down by the detach() routine with the DDI_PM_SUSPEND command.

To accompany the detach() and attach() routines, a new power() routine should also be implemented in each device driver for a power manageable hardware component. The power() routine is a new device driver entry point used to adjust the amount of power provided to the associated hardware components. If a device driver cannot control a hardware component power directly, the device driver asks its parent to control power using a new DDI interface called ddi_power().

The power() routine is separate from the DDI_PM_SUSPEND and DDI_RESUME commands of the detach() and attach() routines so that the DDI_PM_SUSPEND and DDI_RESUME commands can be used without changing the power of the underlying hardware component. This allows the DDI_PM_SUSPEND and DDI_RESUME commands of the detach() and attach() routines to be used with rapid system shut down and resume operations, as disclosed in the copending patent application "Method & Apparatus for A Multi-Layer System Quiescent Suspend and Resume Operation", Ser. No. 08/189,417, filed Jan. 1, 1994.

The Power Management Pseudo-Device Driver reduces the power provided to inactive hardware components. To determine when a hardware component is inactive, each device driver maintains a last access time for each associated hardware component. The last access time is maintained as a property for the device driver in the DDI/DKI layer 50 such that the last access time is available to the Power Management Pseudo-Device Driver.

Each time the device driver physically access a hardware component, the device driver sets the last access time to zero thereby indicating that the hardware component is currently busy. After completing the physical access to the hardware component, the device driver places the current time into the last access time. Since the last access time is not updated unless the hardware component is actually used, all calls to the device driver that produce no physical access to the actual hardware component are not counted in the last access time. The Power Management Pseudo-Device Driver accesses the last access time maintained by the device driver using the DDI/DKI layer 50.

Finally, each compatible device driver should be able to notify the Power Management Pseudo-Device Driver when an access to the device component occurs while the device driver has been suspended. In this manner the Power Management Pseudo-Device Driver can take the device driver out of its suspend state such that the device driver can respond to the access.

To inform the Power Management Pseudo-Device Driver about an access to a suspended device driver, the suspended device driver calls a new DDI routine entitled ddi_dev_is_needed(). The ddi_dev_is_needed() routine informs the Power Management Pseudo-Device Driver about the access to the suspended device driver.

DDI/DKI Layer Additions

As stated in the previous section, a suspended device driver should inform the Power Management Pseudo-Device Driver when the suspended device driver is accessed. Thus a new ddi_dev_is_needed() routine should be added to the Device Driver Interface and Driver Kernel Interface (DDI/DKI) layer 50 of FIG. 1 that allows a device driver to communicate with the Power Management Pseudo-Device Driver. The format of the ddi_dev_is_needed() routine is provided in the Appendix.

In response to a request received using the ddi_dev_is_needed() routine, the Power Management Pseudo-Device Driver usually restores power to a powered down hardware component using the power() routine. However, some device drivers cannot restore power to their components alone. Such device drivers request a parent to power their components up using a new ddi_power() routine. The ddi_power() routine is called recursively until a device driver with the proper authority restores power to the requesting device. The format of the ddi_power() routine is also provided in the Appendix.

Power Management Pseudo-Device Driver

The main addition to the UNIX® operating system of the present invention is a pseudo-device driver called the Power Management Pseudo-Device Driver. A pseudo-device driver is very similar to a normal device driver such as the device drivers 41, 42, and 43 illustrated in FIG. 1.

Figure 2A:
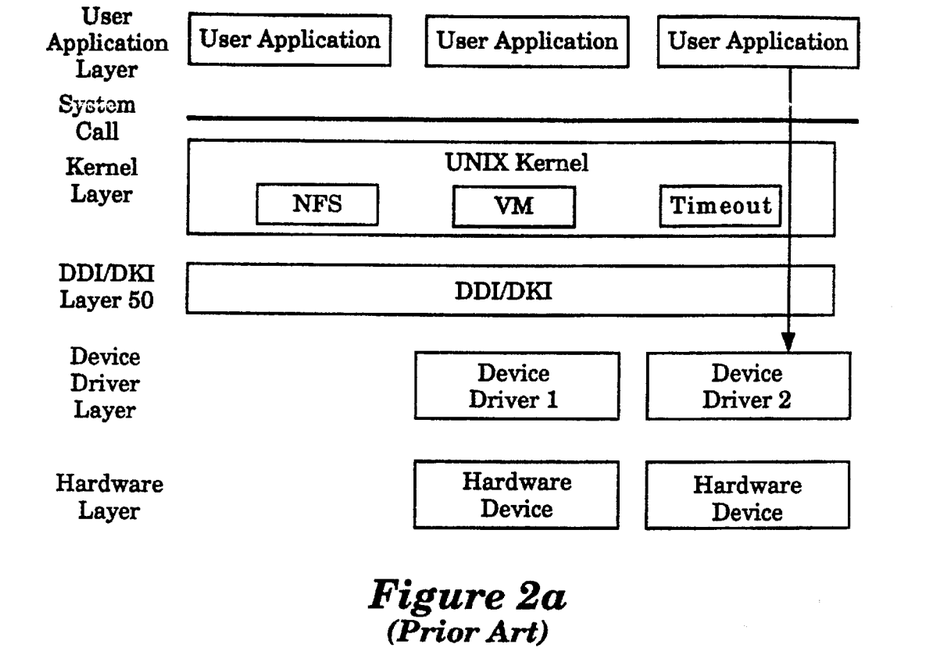
FIG. 2a illustrates a user application process adjusting the parameters of a device driver by making an ioctl() call to the device driver.
Figure 2B:
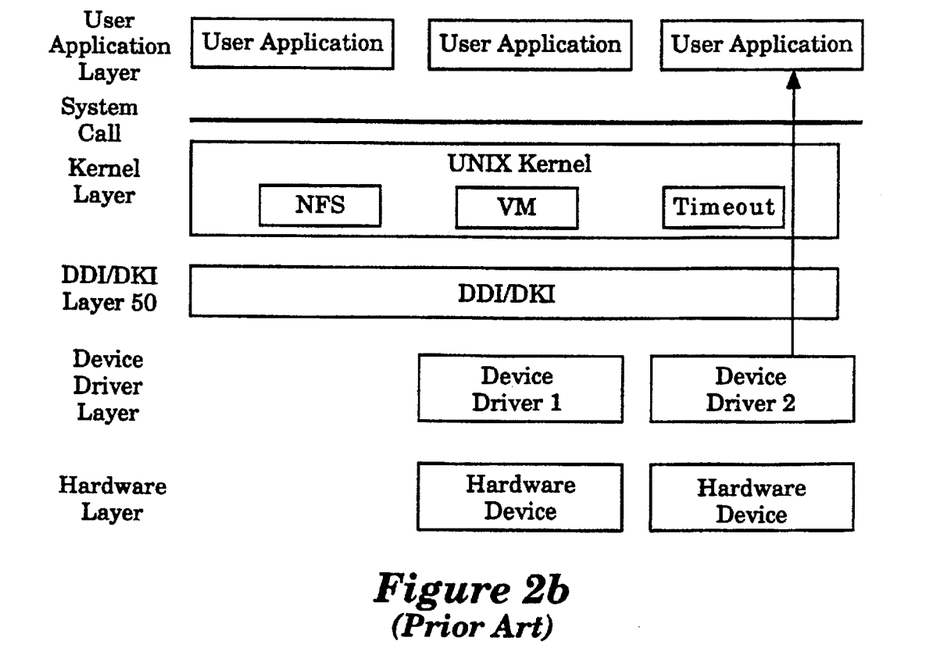

Device drivers can be controlled by user application programs or by the system kernel using an ioctl() routine. FIG. 2a illustrates a user application program making a request to a device driver using the ioctl() routine. The device driver performs the request by directly controlling the associated hardware component. As illustrated in FIG. 2b, the device driver responds back to the user application program when it has completed the requested task.

Figure 3:
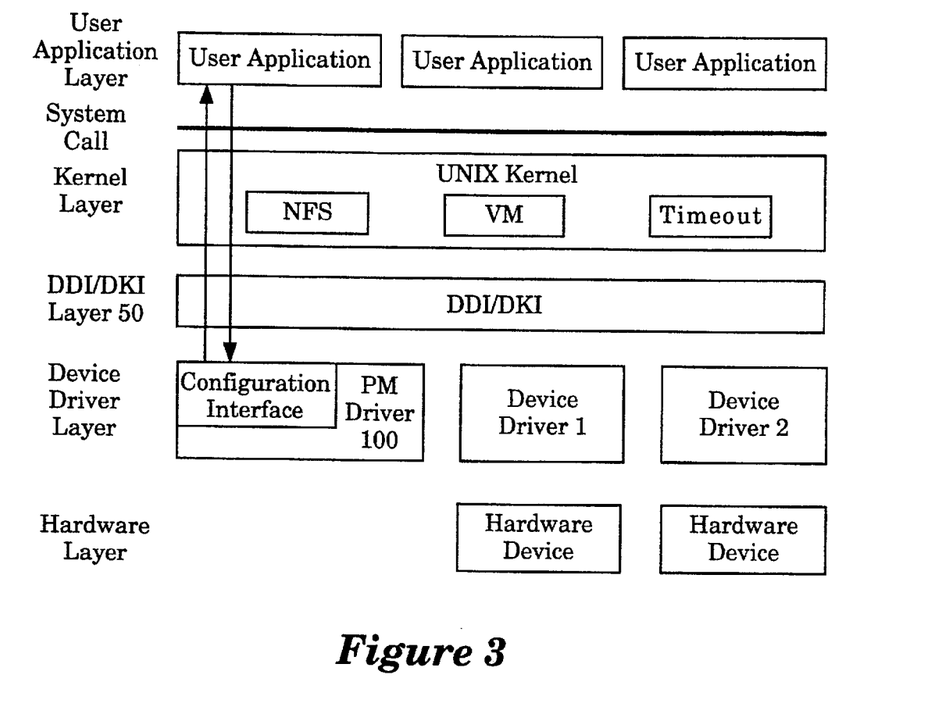
FIG. 3 illustrates how a user application process can directly adjust parameters in the Power Management Pseudo-Device Driver using an ioctl() call.

A pseudo-device driver is very similar to a normal device driver except that a pseudo-device driver does not have an associated hardware device. FIG. 3 illustrates a Power Management Pseudo-Device Driver 100 added to the UNIX® environment of FIG. 2a. As illustrated in FIG. 3, the Power Management Pseudo-Device Driver 100 can also be directly controlled by a user application program using the ioctl() routine. The Power Management Pseudo-Device Driver 100 is an independently loadable module that need not be present for the computer system to operate. However, when added to a computer system, the Power Management Pseudo-Device Driver 100 provides useful power management features to the computer system.

The Power Management Pseudo-Device Driver 100 performs three main functions. First, the Power Management Pseudo-Device Driver 100 is configurable. As illustrated in FIG. 3, a user or the system can configure the parameters of the Power Management Pseudo-Device Driver 100 as desired. Second, the Power Management Pseudo-Device Driver 100 supervises all the compatible device drivers in the system by scanning the last access times for each device. Finally, the Power Management Pseudo-Device Driver 100 performs the service of turning the various hardware components on and off according to the defined power management configuration.

The Power Management Pseudo-Device Driver can be configured by the user in any particular way. Configuration of the Power Management Pseudo-Device Driver is performed by calling the ioctl() routine. The definition of the Power Management Pseudo-Device Driver ioctl() routine is provided in the Appendix. The following commands can be issued to adjust Power Management Pseudo-Device Driver parameters using the ioctl() routine:

PM_SCHEDULE: Retrieve and/or modify the period between device driver tree scans. A value of zero turns the scanning off. A negative value is ignored. Ioctl returns the current scan period in seconds.

PM_GET_IDLE_TIME: Retrieve the idle time of a specified hardware device component. Ioctl returns the idle time of the hardware device component in seconds.

PM_GET_NUM_CMPTS: Retrieve the number of hardware components controlled by a specified device driver. Ioctl returns the number of controlled hardware components.

PM_GET_THRESHOLD: Retrieve the seconds a specified hardware component must be idle before being power-manageable. Ioctl returns success or failure.

PM_GET_POWER: Retrieve the normal power level of a specified hardware component.

PM_SET_POWER: Set the normal power level of a specified hardware component.

PM_GET_CUR_PWR: Retrieve the current power level of a specified hardware component.

PM_GET_NUM_DEPS: Retrieve the number of dependent devices a specified device has. Ioctl returns the number of dependent devices.

PM_GET_DEP: Retrieve a dependent device name of a specified hardware device. Ioctl returns the name of the dependent device.

PM_ADD_DEP: Add a dependent hardware device to the specified hardware device. Ioctl returns success or failure.

PM_REM_DEP: Remove a dependent hardware device from the specified hardware device. loctl returns success or failure.

PM_REM_DEVICE: Remove all power management information associated with the specified hardware device. This function stops the specified hardware device from being power-managed.

One of the most important configurable features is the dependency of each hardware device. The dependencies can either be a real physical dependency or a defined logical dependency.

A physical dependency can be described using the example of a SCSI disk drive and a SCSI bus controller. A SCSI disk drive that is located on a SCSI bus cannot operate with out the cooperation of a SCSI bus controller. Thus, the disk drive is physically dependent on the SCSI bus controller.

A logical dependency can be described using the example of a display screen and user input devices. The power to a display screen should be viewed as being dependent upon activities on any user input devices such that the power to the display screen will not be turned off if any activity has been detected on any of the user input devices.

Figure 4:
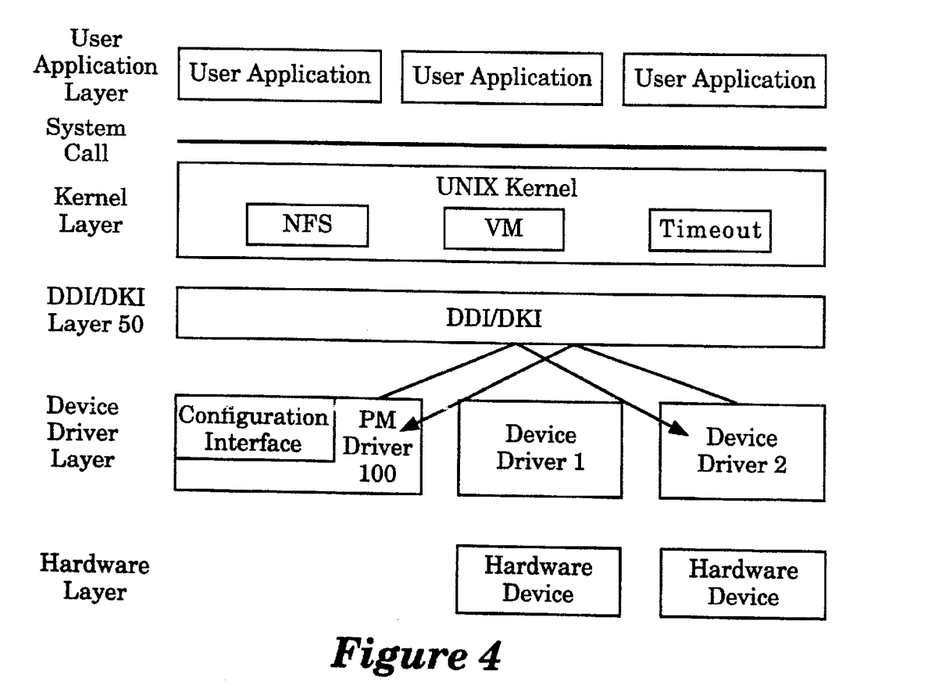
FIG. 4 illustrates the Power Management Pseudo-Device Driver making a status request on one of the device drivers in the system.

The Power Management Pseudo-Device Driver supervises the other device drivers which are compatible with the power management system such that it monitors the other device drivers to determine when their associated hardware devices become idle. FIG. 4 illustrates how the Power Management Pseudo-Device Driver calls a function in a device driver through the DDI/DKI layer 50 to learn about the last access time of a hardware device. If the Power Management Pseudo-Device Driver 100 detects that the hardware device has been idle for a time period exceeding the threshold for that hardware device, the Power Management Pseudo-Device Driver 100 uses a command of detach() to suspend that device driver and then turns off the hardware device's power.

Power Management System Operation

As stated in the previous section, the Power Management Pseudo-Device Driver 100 reduces the power provided to idle hardware device components that are power-manageable. If an access request is received by a powered down hardware device component, the hardware device component must be turned back on. An example of this situation is described with reference to FIGS. 5a, 5b, and 6.

Figure 6:
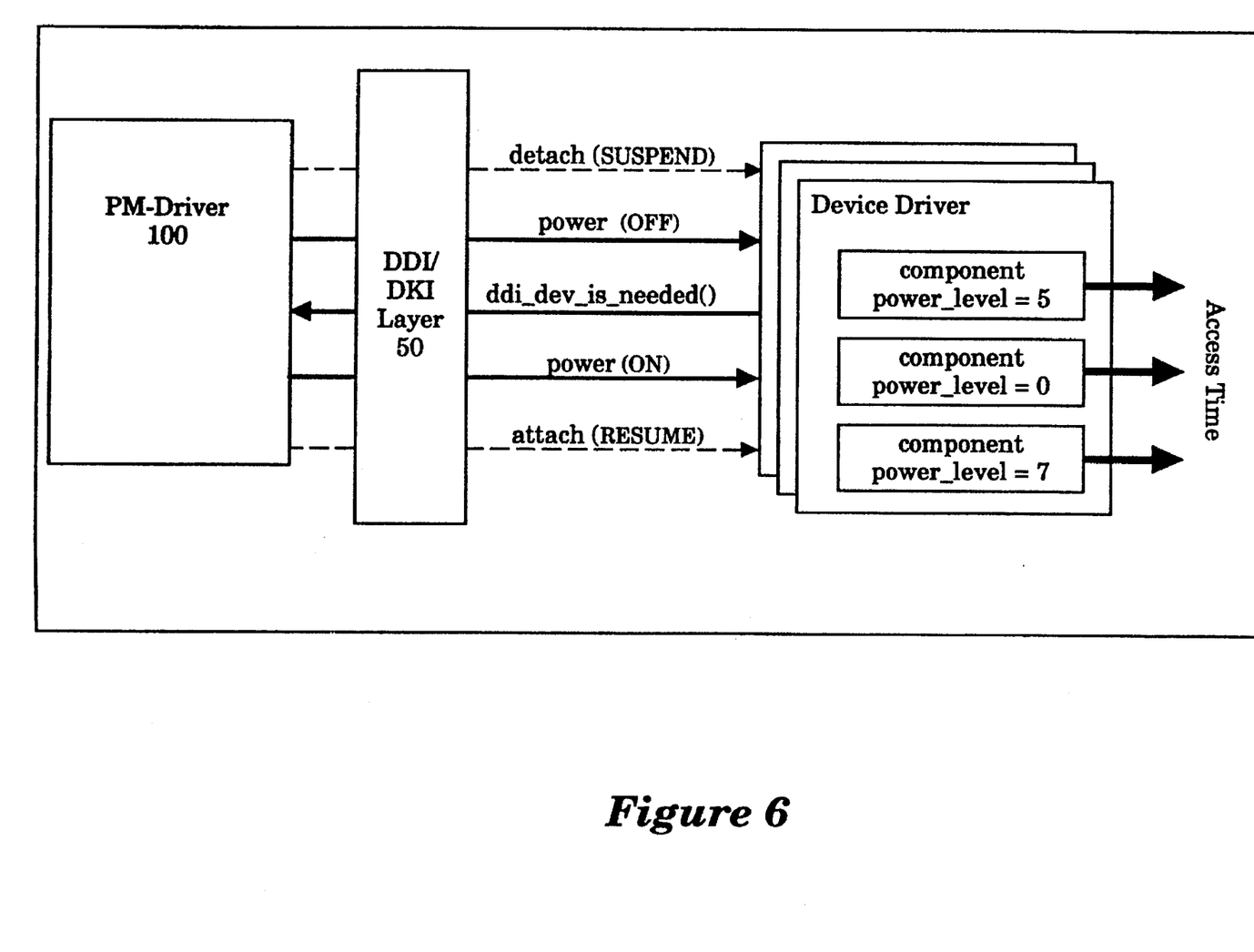
FIG. 6 illustrates the sequence of communication between the Power Management Pseudo-Device Driver and a device driver throughout a cycle of powering down and powering up a hardware component.

Referring to FIG. 6, when the Power Management Pseudo-Device Driver 100 determines a hardware device component is idle, the Power Management Pseudo-Device Driver 100 first calls the detach() routine in the hardware device's device driver to save the hardware device's state if necessary. Some hardware device components have no state that needs to be saved such that this step is not always necessary. Thus, the line for the detach() routine on FIG. 6 is dashed line. After saving the hardware device's state with the detach() routine, if necessary, the Management Pseudo-Device Driver 100 calls the power() routine to power down the hardware device component.

Figure 5A:
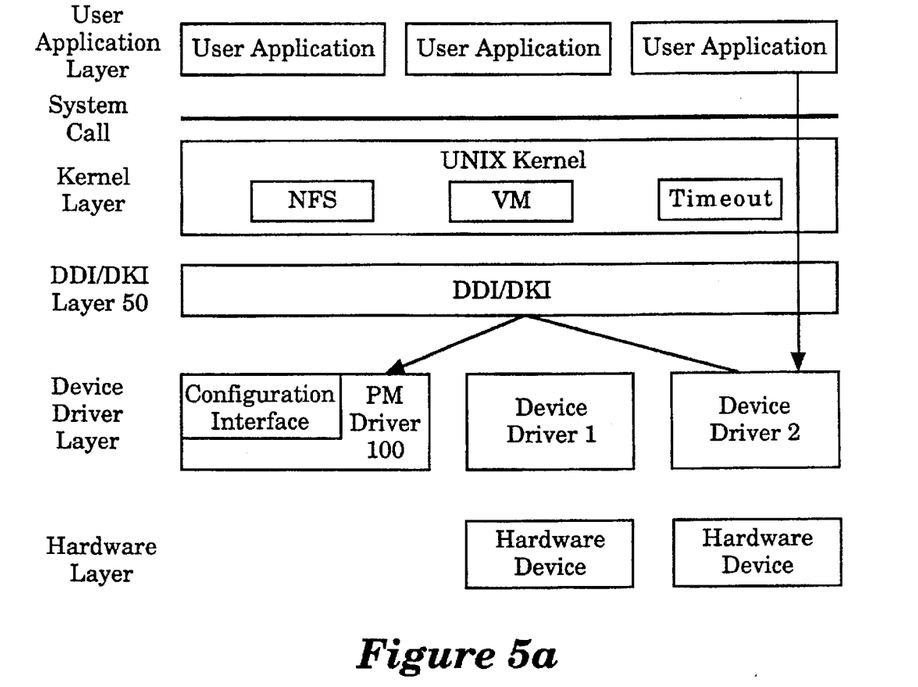
FIG. 5a illustrates a user application process making an access request to a device driver that has been powered down such that the request is instead directed to the Power Management Pseudo-Device Driver.
Figure 5B:
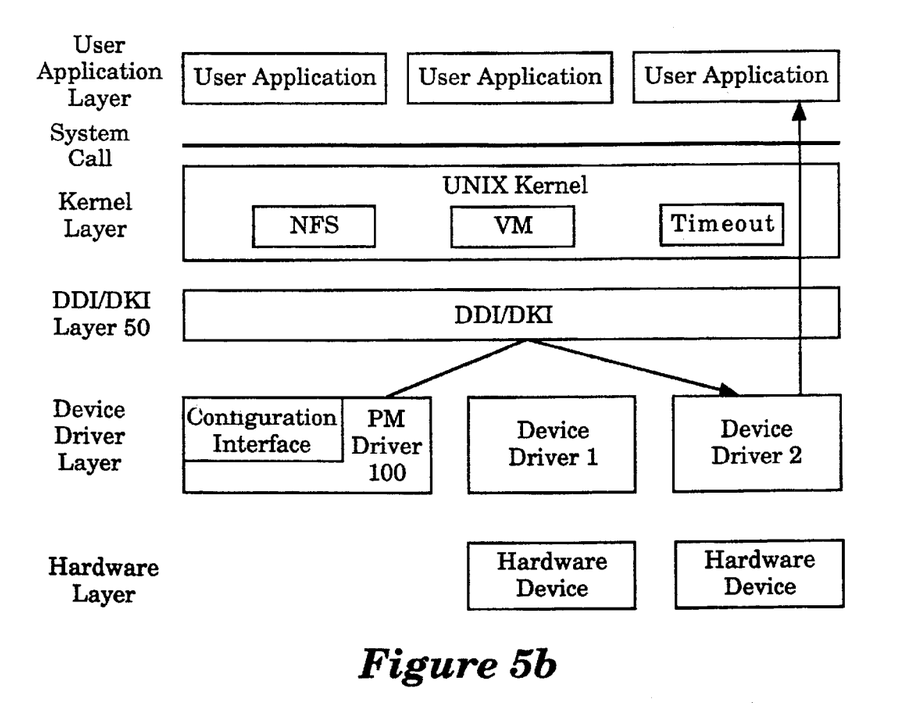
FIG. 5b illustrates the Power Management Pseudo-Device Driver responding to a request to a powered down device driver wherein the Power Management Pseudo-Device Driver powers up the device driver and the powered up device driver responds to the original call.

FIG. 5a illustrates a user application requesting access to a powered down hardware device component. In response to the access request, the device driver calls the ddi_dev_is_needed() routine as illustrated in FIG. 5a and FIG. 6.

In response to the ddi_dev_is_needed() routine, the Management Pseudo-Device Driver 100 first calls the power() routine to restore power to the hardware device component. After restoring the hardware device component's power with the power() routine, the Power Management Pseudo-Device Driver 100 then calls the attach() routine in the hardware device's device driver to restore the hardware device component's state, if necessary. As with the detach() step, this step is not always necessary since some hardware devices have no state that needs to be restored, thus the line for the attach() routine on FIG. 6 is dashed line. At this point, the powered up hardware device can respond to the access request.

Although the present invention has been described in terms of specific exemplary embodiments, it will be appreciated that various modifications and alterations might be made by those skilled in the art without departing from the spirit and scope of the invention as set forth in the following claims.

APPENDIX ddi dev is needed( ) function

```
void
ddi_dev_is_needed(dev_info_t*dip, int pm_cmpt, int pm_level)
{
    int    (*fn)(dev_info_t*, int, int);
    int    length=sizeof (fn);
    if (ddi_prop_op(DDI_DEV_T_ANY, ddi_root_node( ),
```

-continued

APPENDIX

```
        PROP_LEN_AND_VAL_BUF,
        DDI_PROP_DONTPASS | DDI_PROP_NOTPROM, "cpr-driver",
        (caddr_t)&fn,
        &length)==DDI_PROP_SUCCESS ||
        ddi_prop_op(DDI_DEV_T_ANY, ddi_root node( ),
        PROP_LEN_AND_VAL_BUF,
        DDI_PROP_DONTPASS | DDI_PROP_NOTPROM, "pm-driver",
        (caddr_t)&fn,
        &length)==DDI_PROP_SUCCESS)
            (*fn)(dip, pm_cmpt, pm_level);
}
``` ddi power( ) function

```
int
ddi_power(dev_info_t*dip, int pm_compt, int pm_level)
{
    pm_request request;
    request.who=dip;
    request.cmpt=pm_compt;
    request.level=pm_level;
    return (ddi_ctlops(devi, dip, DDI_CTLOPS_POWER, &request,
    NULL));
}
```

Power Management Pseudo-Device Driver User Interface

```
pm_ioctl(dev_t dev, int cmd, int arg, int mode, cred_t *cred_p,
int *rval_p);
```

The parameter arg is a pointer to the structure:

```
typedef struct {
    char    *who;
    int     select;
    int     level;
    char    *dependent;   /* buffer for name of dependent */
    int     size;         /* size of dependent buffer */
} pm_request;
```

The parameter cmd is one of:
PM_SCHEDULE,
PM_GET_IDLE_TIME,
PM_GET_NUM_CMPTS,
PM_GET_THRESHOLD,
PM_SET_THRESHOLD,
PM_GET_POWER,
PM_SET_POWER,
PM_GET_CUR_PWR,
PM_GET_NUM_DEPS,
PM_GET_DEP,
PM_ADD_DEP,
PM_REM_DEP,
PM_REM_DEVICE.

PM_SCHEDULE: Retrieve and/or modify the period between device tree scans, arg=new period in seconds, a value of zero turns scans off, a negative value is ignored. Ioctl returns the current period in seconds.

PX_GET_IDLE: Retrieve the idle time of a device component, arg=p_request (fields who, select). Ioctl returns idle time.

PM_GET_NUM_CMPTS: Retrieve the number of components of a device, arg=pm_request (field select). Ioctl returns the number.

PM_GET_THRESHOLD: Retrieve the seconds a component must be idle before being power-manageable, arg=pm_request (fields who, select, level; level=threshold). Ioctl return success or failure.

PM_GET_POWER: Retrieve the normal power level of a component, arg=pm_request (fields who, select).

PM_SET_POWER: Set the normal power level of a component, arg=pm_request (fields who, select, level; level=power level).

PM_GET_CUR_PWR: Retrieve the current power level of a component, arg=pm_request (fields who, select)

PM_GET_NUM_DEPS: Retrieve the number of dependents a device has, arg=pm_request (field who). Ioctl returns the number.

PM_GET_DEP: Retrieve a dependent of a device, arg=pm_request (fields who, select, dependent, size). Ioctl returns the name in the dependent field.

PM_ADD_DEP: Add a dependent to the device, arg=pm_request (fields who, dependent). Ioctl returns success or failure.

PM_REM_DEP: Remove a dependent from the device, arg=pm_request (fields who, dependent). Ioctl returns success or failure.

PM_REM_DEVICE: Remove all power management information associated with the given device, arg=pm_request (field who).

/* (field X, Y) indicates the parameters that to be provided */

What is claimed is:

1. An apparatus for conserving power in a computer system, said computer system including an operating system, said operating system having a defined interface for interacting with a plurality of device drivers, said apparatus comprising the elements of:
at least one power manageable hardware component coupled to said computer system;
a respective power management compatible device driver for each of said power manageable hardware components, each said respective power management compatible device driver for controlling said power manageable hardware component, each of said respective power management compatible device drivers accessible by said operating system, each of said respective power management compatible device drivers determining a last access time for said respective power manageable hardware component; and
a power management driver, said power management driver polling said respective power management compatible device drivers to determine if an associated power manageable hardware component is idle, said power management driver for adjusting power provided to said associated power manageable hardware component if said associated power manageable hardware component is idle, said power management driver comprising a device driver accessible by said operating system.

2. The apparatus as claimed in claim 1 wherein said power management driver further comprises a configuration interface for configuring said power management driver.

3. The apparatus as claimed in claim 1 wherein each of said respective power management compatible device drivers comprises a signaling unit for signaling said power management driver if an access occurs to said respective power management compatible device drivers when said respective power manageable hardware component is powered down.

4. The apparatus as claimed in claim 1 further comprising:
a second power manageable hardware component, said second power manageable hardware component physically or logically dependent upon said first power manageable hardware component.

5. The apparatus as claimed in claim 1 wherein said power management driver comprises a device driver that is not necessary for said computer system to operate.

6. The apparatus as claimed in claim 1 wherein said first device driver comprises a power controller for controlling power supplied to said first hardware device.

7. The apparatus as claimed in claim 1 wherein said power management driver is written for the UNIX® operating system.

8. A method of conserving power in a computer system, said computer system including a first power manageable hardware device and an operating system, said method comprising the steps of:
maintaining a last access time for said first power manageable hardware device by a first device driver;
polling said first device driver from a power management driver to obtain said last access time;
determining in said power management driver if said power manageable hardware device is idle using said last access time, said power management driver comprising a second device driver accessible by said operating system; and
adjusting power to said first power manageable hardware device if said power management driver determines said first power manageable hardware device is idle.

9. The method as claimed in claim 8 further comprising the step of
configuring said power management driver from an application program according to a user's preferences.

10. The method as claimed in claim 8 wherein said step of adjusting power to said first power manageable hardware device is performed by said first device driver.

11. The method as claimed in claim 8 further comprising the step of
requesting access to said first power manageable hardware device from a user application program when said first power manageable hardware device is powered down;
informing said power management driver about said access to said first power manageable hardware device from said user application program; and
powering said first power manageable hardware device back up such that said first power manageable hardware device can process said access to said power manageable first hardware device from said user application program.

12. The method as claimed in claim 11 wherein said step of powering said first power manageable hardware device back up is performed by said first device driver.

13. The method as claimed in claim 8 wherein said power management driver comprises a device driver that is not necessary for said computer system to operate.

14. The method as claimed in claim 8 wherein said operating system comprises the UNIX® operating system.

15. The method as claimed in claim 8 further comprising the step of
informing said power management driver that a second power manageable hardware device is physically or logically dependent upon said first power manageable hardware device such that said power management driver does not adjust power to said first power manageable hardware device unless power to said second power manageable hardware device has been adjusted earlier.

16. A computer system, said computer system comprising the elements of:
a computer processor;
at least one power manageable hardware device including a first power manageable device, each of said power manageable hardware devices coupled to said computer processor;
a respective power management compatible device driver for each of said power manageable hardware devices, said respective power management compatible device drivers including a first power management compatible device driver, each of said power management compatible device drivers for determining a last access time for an associated power manageable hardware device; and
a power management driver for polling said respective power management compatible device drivers to determine if a power manageable hardware device is idle, said power management device driver adjusting power provided to said first power manageable hardware device if said first power manageable hardware device is determined to be idle.

17. The computer system as claimed in claim 16 wherein said first power management compatible device driver further comprises a signaling unit for signaling said power management driver if an access to said first power management compatible device driver occurs when said first power manageable hardware component is powered down.

18. The computer system as claimed in claim 16 further comprising:

a second power manageable hardware device dependent upon said first power manageable hardware device such that said power management driver does not adjust power to said first power manageable hardware device unless power to said second power manageable hardware device has been adjusted.

* * * * *